US006895330B2

(12) United States Patent
Cato et al.

(10) Patent No.: US 6,895,330 B2
(45) Date of Patent: May 17, 2005

(54) SYSTEM FOR THE VISUALLY IMPAIRED TO NAVIGATE A ROUTE THROUGH A FACILITY

(75) Inventors: Robert Thomas Cato, Raleigh, NC (US); Kerry A Ortega, Raleigh, NC (US); Thomas John Sluchak, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/336,278

(22) Filed: Jan. 3, 2003

(65) Prior Publication Data

US 2003/0105584 A1 Jun. 5, 2003

Related U.S. Application Data

(62) Division of application No. 09/802,703, filed on Mar. 9, 2001, now Pat. No. 6,574,549.

(51) Int. Cl.[7] ......................... G01C 21/00; G01C 21/34

(52) U.S. Cl. ....................... 701/209; 701/200; 701/211; 73/178 R; 705/1; 705/14; 705/21; 705/27; 705/28; 235/375; 235/383

(58) Field of Search ................................ 701/209, 200, 701/211, 1, 24, 33, 36; 73/178 R; 340/825.36, 825.52; 705/1, 14, 21, 27, 28; 235/375, 383

(56) References Cited

U.S. PATENT DOCUMENTS

| | | | | | |
|---|---|---|---|---|---|
| 5,031,104 | A | | 7/1991 | Ikeda et al. | 340/990 |
| 5,144,294 | A | | 9/1992 | Alonzi et al. | |
| 5,297,049 | A | * | 3/1994 | Gurmu et al. | 701/117 |
| 5,508,699 | A | | 4/1996 | Silverman | |
| 5,572,653 | A | | 11/1996 | DeTemple et al. | 235/383 |
| 5,806,017 | A | | 9/1998 | Hancock | |
| 5,874,905 | A | * | 2/1999 | Nanba et al. | 340/995 |
| 5,920,361 | A | | 7/1999 | Gibeau et al. | 348/750 |
| 5,931,888 | A | * | 8/1999 | Hiyokawa | 701/208 |
| 5,995,015 | A | | 11/1999 | DeTemple et al. | |
| 6,078,864 | A | | 6/2000 | Long et al. | 340/995 |
| 6,097,305 | A | | 8/2000 | Im et al. | |
| 6,172,641 | B1 | | 1/2001 | Millington | 340/996 |
| 6,356,839 | B1 | | 3/2002 | Monde et al. | 340/995 |

* cited by examiner

*Primary Examiner*—William A. Cuchlinski, Jr.
*Assistant Examiner*—Olga Hernandez
(74) *Attorney, Agent, or Firm*—Daniel E. McConnell

(57) ABSTRACT

A system and method of the type for aiding a user in navigating a route through a facility so as too efficiently locate specific items within a facility is provided. The system includes a facility processor having a database and software stored thereon for mapping an interactive route from selected location to selected location within a facility, a label located proximate individual items, the label electronically communicating information specific to the item it is associated with, and a digital device having the interactive route electronically stored thereon, the digital device electronically communicating with the facility processor and the labels for tracking movement of the digital device along the route via communication with the labels and communicating a direction to move to follow the route.

15 Claims, 7 Drawing Sheets

SYSTEM FOR THE VISUALLY IMPAIRED TO NAVIGATE A ROUTE THROUGH A FACILITY

CROSS-REFERENCE TO RELATED APPLICATIONS

This is a divisional application of filed parent application Ser. No. 09/802,703 filed with the United States Patent and Trademark Office on on Mar. 9, 2001, now U.S. Pat. No. 6,574,549, the teachings of which are incorporated herein by reference.

FIELD OF THE INVENTION

The present invention relates generally to the field of electronically aided navigation through a facility and in particular to a method and apparatus for guiding visually impaired individuals along a route in a facility to obtain items or visit locations chosen by the individual.

BACKGROUND INFORMATION

Various methods and systems have been devised to aid visually impaired individuals in unfamiliar surroundings. Devices and systems have been developed in the past to guide the visually impaired by utilizing detection devices to warn the user of obstacles. These prior art systems merely react and signal the user of obstacles and do not aid the user in navigating a route.

Other devices have been developed which aid visually impaired individuals toward specific locations by utilizing remote modules located at specific locations and a mobile module carried by the individual recording distances and transmitting information to the user. Although these devices do aid visually impaired individuals to be more mobile and self-sufficient they do not allow for the user to detail his own task list and have the system create a route for him to travel in a manner to efficiently accomplish the tasks on the list.

It would be a benefit therefore to have a navigation system that allows an individual to create his own task list and have a route provided to accomplish the tasks listed. It would be a further benefit to have a navigation system that allows an individual to create his own task list and electronically submit it to a service provider for the preparation and downloading of a route into the user's personal digital device so as to navigate the route and complete the tasks within a particular facility. It would be a still further benefit to have a navigation system that is adapted for use with many existing electronic label systems currently existing in facilities.

SUMMARY OF THE INVENTION

It is thus an object of the present invention to provide a navigation system that allows an individual to create his own task list and have a route provided for the individual to accomplish the tasks on the list.

It is a further object of the present invention to provide a navigation system that allows an individual to create his own task list and electronically submit it to a facility for the preparation and downloading of a route into the user's personal digital device so as to navigate the route and complete the tasks within the particular facility.

It is a still further object of the present invention to provide a navigation system that interacts with many systems already existing in facilities.

Accordingly, a system and method of the type for aiding a user in navigating a route through a facility so as too efficiently locate specific items within a facility is provided. The system includes a facility processor having a database and software stored thereon for mapping an interactive route from selected location to selected location within a facility, a label located proximate individual items, the label electronically communicating information specific to the item it is associated with, and a digital device having the interactive route electronically stored thereon, the digital device electronically communicating with the facility processor and the labels for tracking movement of the digital device along the route via communication with the labels and communicating a direction to move to follow the route.

A user creates a list of items to acquire, or locations to visit that are specific to a facility. The user then provides this list to a facility processor at the facility or via a network. An interactive route is then created to provide an efficient route for the user to locate all the items on the list. This route is downloaded onto the user's digital device for utilization in the facility. The system utilizes two-way communication between the labels and the digital device and the digital device and the facility processor when necessary to navigate through the facility. The digital device indicates a direction to follow until a listed item is located. The system may utilize any means necessary, such as visual, audio, and/or physical stimulation, to communicate to the user a direction to travel or when an item is located. This system may be used by the visually impaired. The interactive route program may also allow the user to skip items or move through the list and select specific items, the route being adjusted according to the item selected.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
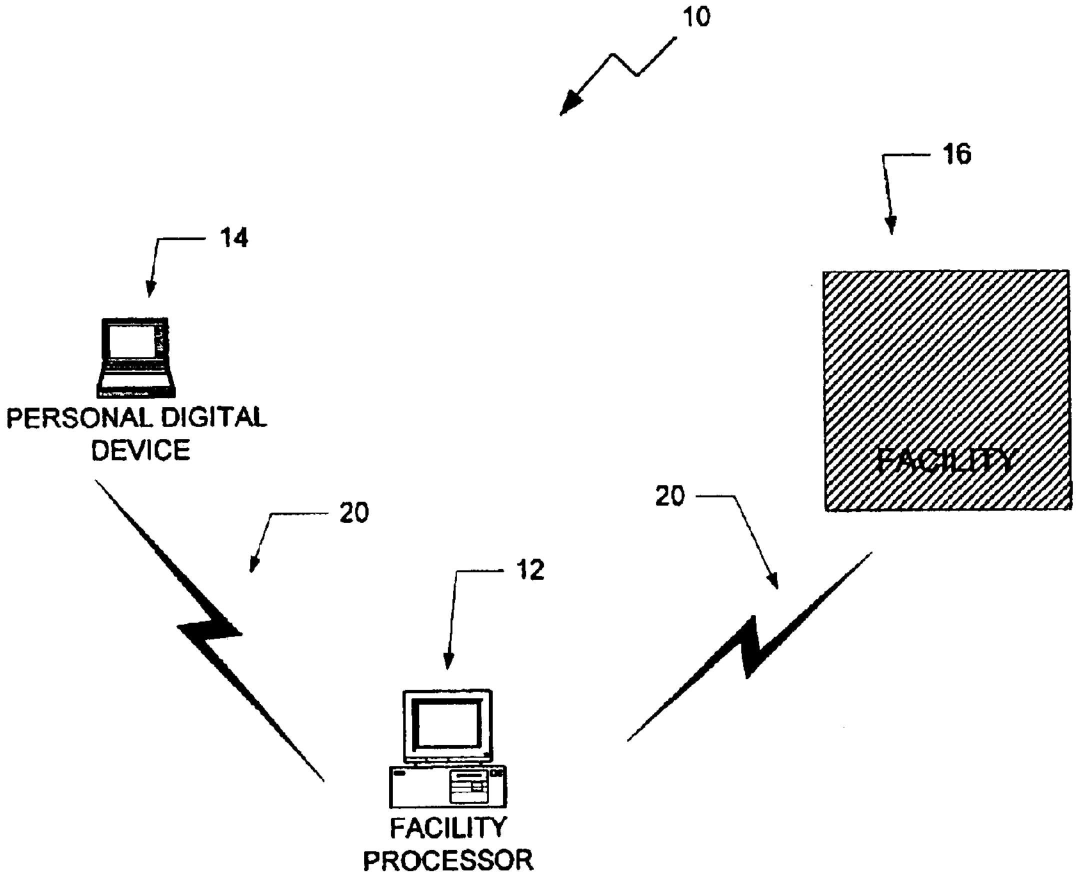
FIG. 1 is an illustration of the navigation system of the present invention.

Refer now to the drawings wherein depicted elements are not necessarily shown to scale and wherein like or similar elements are designated by the same reference numeral through the several figures.

FIG. 1 is an illustration of the navigation system of the present invention generally designated by the numeral 10. Navigation system 10 includes a facility processor 12, a personal digital device 14, and a facility 16. System 10 as shown is adapted for use in a facility such as a grocery store or other sales facility. It should be recognized that navigation system 10 of the present invention may be utilized in many different types of facilities, such as, but not limited to grocery stores, department stores, hardware stores, entertainment centers and the like. For brevity and clarity navigation 10 is described for utilization in a grocery store for aiding visually impaired persons to navigate shopping routes to obtain particular items.

Facility processor 12 may be a dedicated personal computer system, a store controller, or a manager's workstation. Facility processor 12 may be a stand-alone processor or connected to other processors, such as, but not limited to, a corporate headquarters, through a network (not shown). Typically, facility processors will contain inventory data, facility location of inventory, price lists, and promotional offers among other data necessary to operate a sales facility.

Personal digital device 14 is an independently powered, stand-alone, two-way wireless communication device. Personal digital device 14 may be a device such as, but not limited to, a personal digital assistant, laptop computer, cell phone or other similar device. Personal digital device 14 will have software loaded to allow communication with facility processor 12 and labels 18 (FIG. 3).

Figure 2:
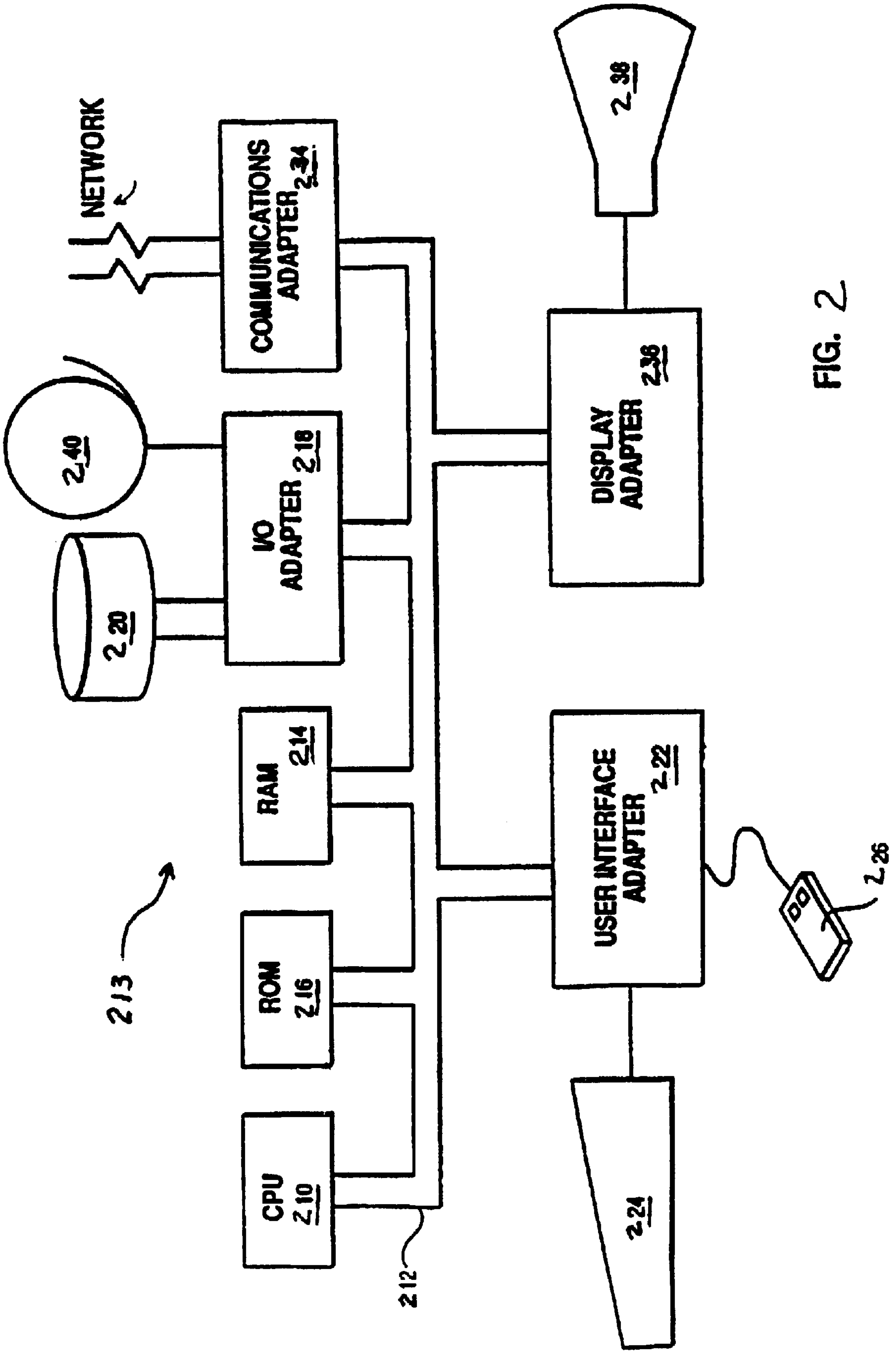
FIG. 2 is a system diagram of a data processing system, including hardware and firmware, which may be used to implement the present invention.

A representative hardware environment which can be used for practicing the present invention is depicted with reference to FIG. 2, which illustrates the hardware configuration of a data processing system 213 in accordance with the subject invention. The representative system may be utilized, in whole or in part, for various elements of the present invention such as facility processor 12, personal digital device 14, and label 18 shown in FIG. 3.

The data processing system 213 includes a central processing unit (CPU) 210, such as a conventional microprocessor, and a number of other units interconnected via a system bus 212. The data processing system 213 includes a random access memory (RAM) 214 and a read only memory (ROM) 216, and may include flash memory. Data processing system 213 may also include an I/O adapter 218 for connecting peripheral devices such as disk units 220 and tape drives 240 to the bus 212, a user interface adapter 222 for connecting a keyboard 224, a mouse 226 and/or other user interface devices such as a touch screen device to the bus 212, a communication adapter 234 for connecting the data processing system 213 to a data processing network 242, and a display adapter 236 for connecting the bus 212 to a display device 238 which may include sound. The CPU 210 may include other circuitry not shown herein, which will include circuitry found within a microprocessor, e.g., an execution unit, a bus interface unit, an arithmetic logic unit (ALU), etc. The CPU 210 may also reside on a single integrated circuit (IC).

Figure 3:
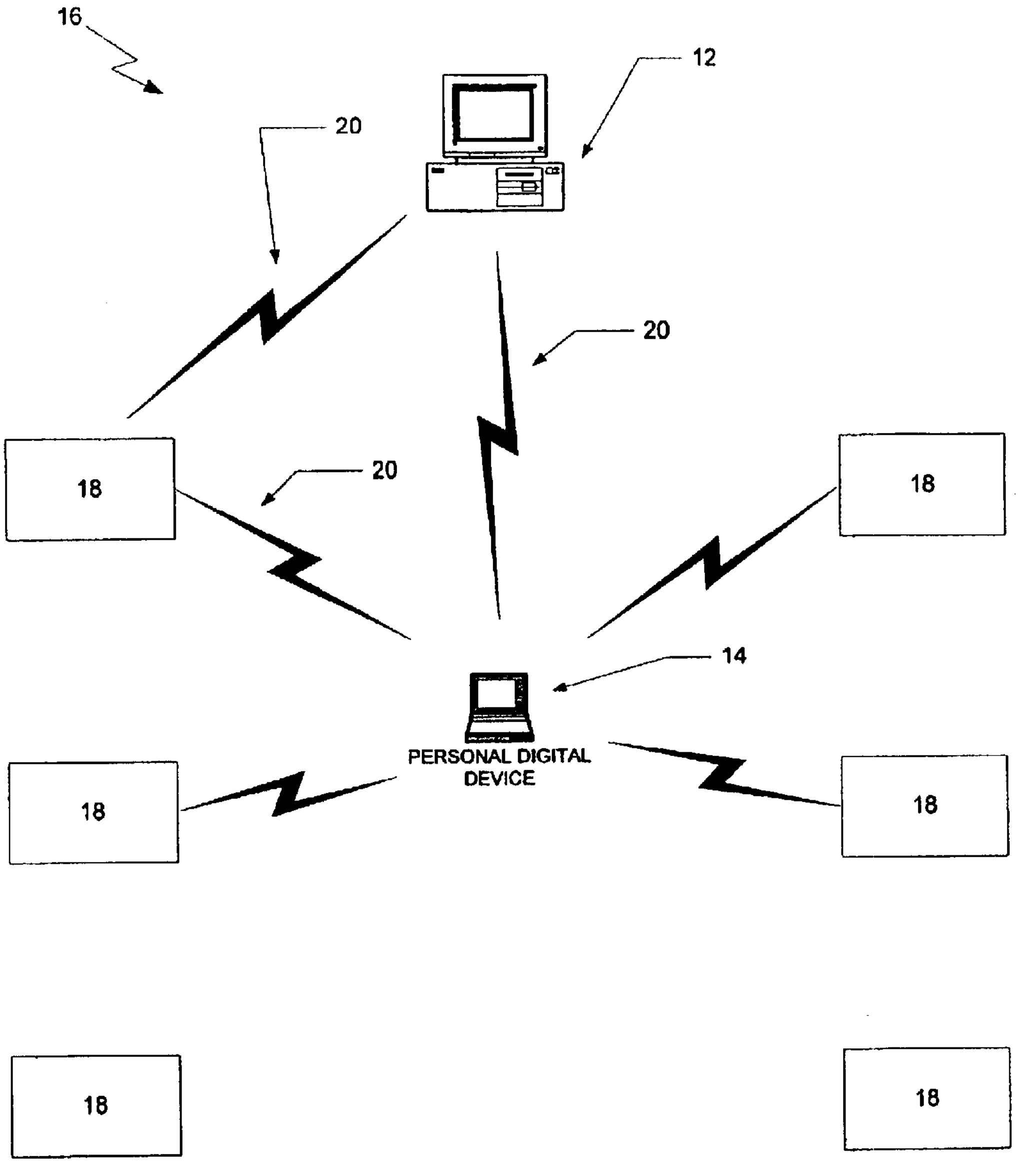
FIG. 3 is an illustration of a navigation system of the present invention utilizing radio frequency (RF) communication.

FIG. 3 is an illustration of navigation system 10 of the present invention utilizing radio frequency (RF) communication. As shown, facility 16 includes facility processor 12 and a plurality of labels 18. Facility processor 12 contains stored information such as store inventory, price lists, store diagrams, label 18 locations in the facility, and promotional information. Facility processor 12 may include software which allows mapping of the locations of labels 18 in facility 16. Facility processor 12 is connected to one or more RF links 20 for transmitting and receiving radio frequencies. It should be recognized that the system is described utilizing radio frequency, however, infrared technology or hard-wire communication may be utilized.

Each label 18 may be an independently powered, stand-alone, two-way communication device. Label 18 may be a radio frequency identification tag. Labels 18 are placed along shelves, such as in a grocery store, adjacent to a product that it identifies. As represented in FIG. 3, labels 18 have been placed on two rows of shelves forming an aisle. Labels 18 may be loaded with information such as the location of label 18, the item represented, item price, and promotional offers. This information may be pre-loaded and/or edited via communication from facility processor 12. Labels 18 may be programmed to transmit information back to facility processor 12.

The electronic label system as shown in FIG. 3 may be utilized with systems available for use in retail facilities. The present invention utilizes these in-place and readably available systems in-part, to aid the visually impaired to shop in a self-sufficient and timely manner.

A user creates a task list and has an interactive route, created to locate each item listed, loaded via a network or directly from facility processor 12 at facility 16 into personal digital device 14. Once the route is downloaded and the user and personal digital device 14 enter a particular facility 16, personal digital device 14 polls labels 18 within transmission range. When a label 18 is polled it will respond with an item identification such as a barcode and may transmit a location and additional information. When personal digital device 14 receives the signal from a label 18, it processes the information sent, comparing it to the route identified and indicates to the user if it is a product he desires or may indicate that the user is to move forward or in a different direction. Personal digital device 14 may transmit the received barcode from a label 18 and send it to facility processor 12 to receive the location of personal digital device 14 for routing information. The personal digital device may provide information to the user utilizing audible, visible, and/or physical stimulation methods such as a synthetic voice, buzzers, vibration, braille display, or lights depending on the ability of the user.

By requesting as little information as possible from labels 18, the label's battery life is prolonged. Additionally, if the wireless link between label 18 and personal digital device 14 is limited limited to a very short range, navigation system 10 can more accurately pinpoint the location of the shopper on the route.

Figure 4:
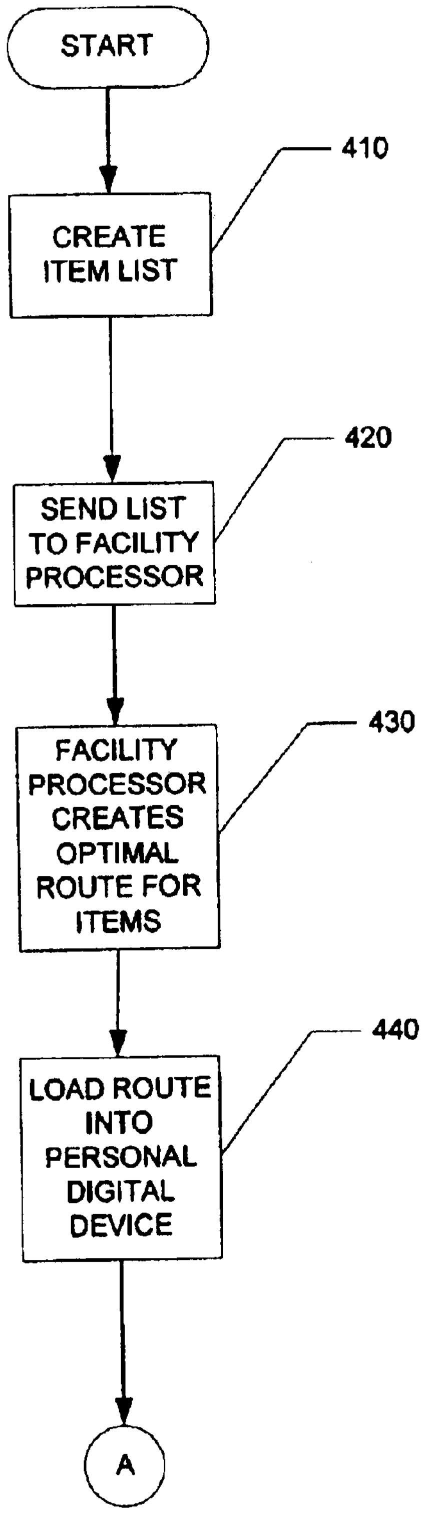
FIG. 4 is a flowchart of a method of initiating the navigation system of the present invention.

FIG. 4 is a flowchart of a method of initiating navigation system 10 of the present invention described with reference to FIGS. 1 through 3. A shopper creates a shopping list, step 410. The shopper then transmits the list to facility processor 12, step 420. The shopper may transmit the list to facility processor 12 via a network or upload the list at facility 16. The list may be a hard copy and scanned into facility processor 12. In step 430, facility processor 12 compares the listed items to the location of the items in the store and creates an optimal route through facility 16 to obtain the items listed. The route may be recalculated during use if the user elects to skip an item listed. In step 440, the route is loaded into personal digital device 14 of the user either over a network or at facility 16.

Figure 5A:
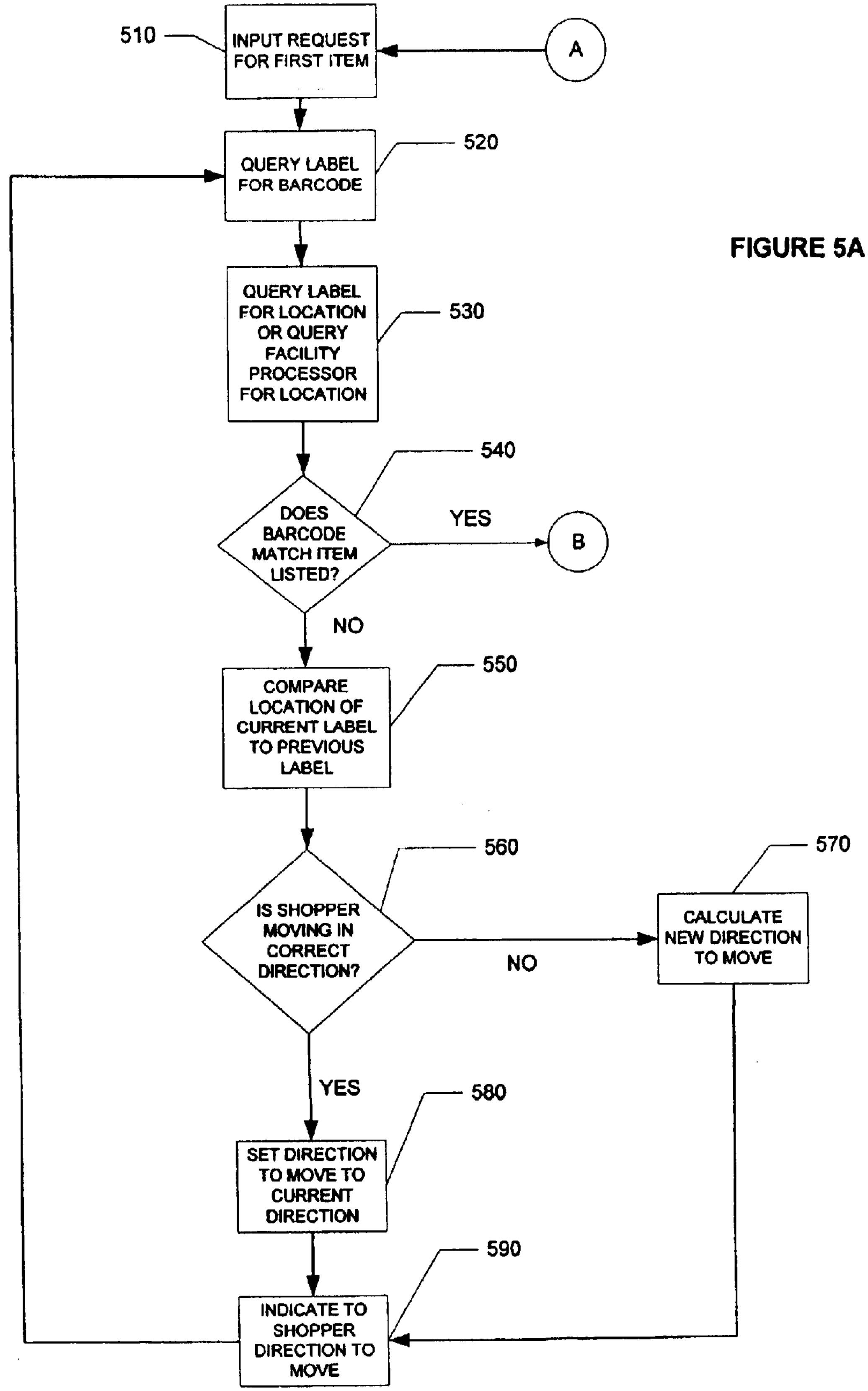
FIGS. 5A, 5B, 5C is a flowchart of a method of the navigation system of the present invention.
Figure 5B:
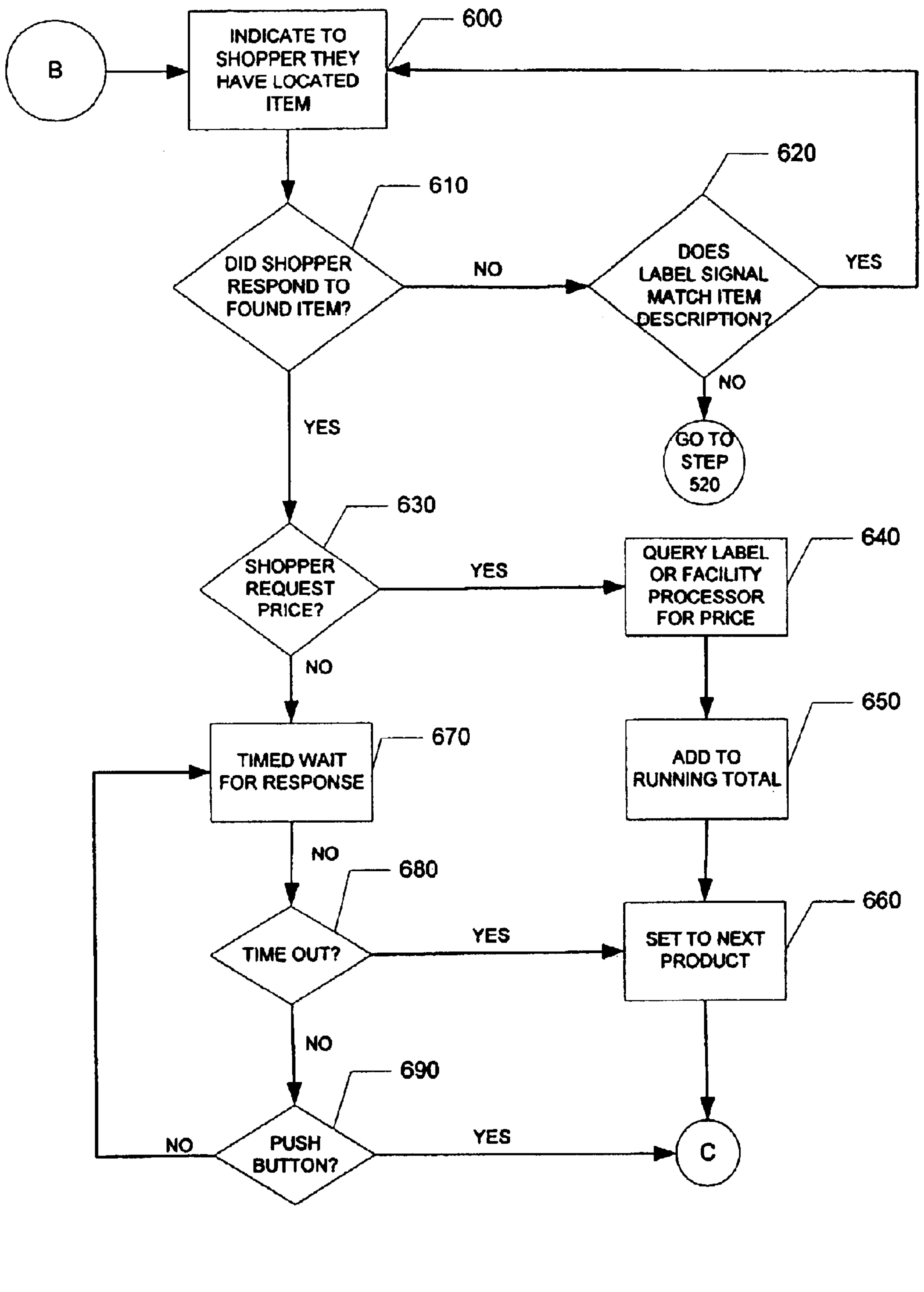

FIG. 5A is a flowchart of a method of navigation system 10 of the present invention described in relation to FIGS. 1 through 4. Once the shopper has the route loaded into his personal digital device 14 ,he initiates the programing and shopping route in step 510. In step 510, the shopper initiates the navigation program by inputting a request for the first product. The shopper may input the request by typing it into the personal digital device 14, utilizing voice recognition, utilizing a dedicated key on the personal digital device 14, or any other method known to operate a computing device by the visually impaired. In step 520, personal digital device 14 queries a label 18 for a barcode. If more than one label 18 transmits a barcode, personal digital device 14 accepts the strongest signal. In step 530, personal digital device 14 queries label 18 for a location; if no location is transmitted from label 18, the information is obtained from facility processor 12. In step 540, if personal digital device 14 recognizes the barcode as an item listed, the process continues as shown in FIG. 5B. If the barcode is not recognized as an item desired, personal digital device 14 compares the location of the previous label 18 with that of the current label 18 location, step 550. In step 560, personal digital device 14 determines if the shopper is moving in the correct direction. If the shopper is not moving in the correct direction, the correct direction is calculated, step 570, and the correct direction is indicated to the shopper in step 590. If the shopper is moving in the correct direction, that direction is set in step 580 and is indicated to the shopper in step 590. This process is continued until the shopper locates the first item listed.

FIG. 5B is a flowchart of a method of navigation system 10 of the present invention described in relation to FIGS. 1 through 5A. FIG. 5B is an illustration of the found product process of system 10. Once the barcode transmitted from a label 18 matches an item listed, an indication is given to the shopper that the item is located, step 600. In step 610, personal digital device 14 inquires if the shopper responds to the found item. If the shopper does not respond to personal digital device 14, the barcode is again checked against the item listed, step 620. If the barcode matches the listed item, the process resets to step 600. This loop continues for a set number of times. If the barcode does not match the listed item, the process resets to step 520. If the shopper responds that the item is found, personal digital device 14 queries if the shopper would like a price check, step 630. If price is requested, personal digital device 14 queries label 18 and/or facility processor 12 for the price, step 640. The price received is then stored in a running price total, step 650. Then system 10 is set to locate the next item listed in step 660 and the process continues as shown in FIG. 5C. If the shopper does not request a price in step 630, system 10 waits a specified time for a response, step 670. If the preset wait time passes, step 680, system 10 is set to the next product listed, step 660. If the shopper indicates by pushing a button or submits a response in another manner established for another item in step 690, the method continues as shown in FIG. 5C. If the shopper does not give an indication as to price request in steps 670–690, the program repeats a set number of times before moving to step 660.

Figure 5C:
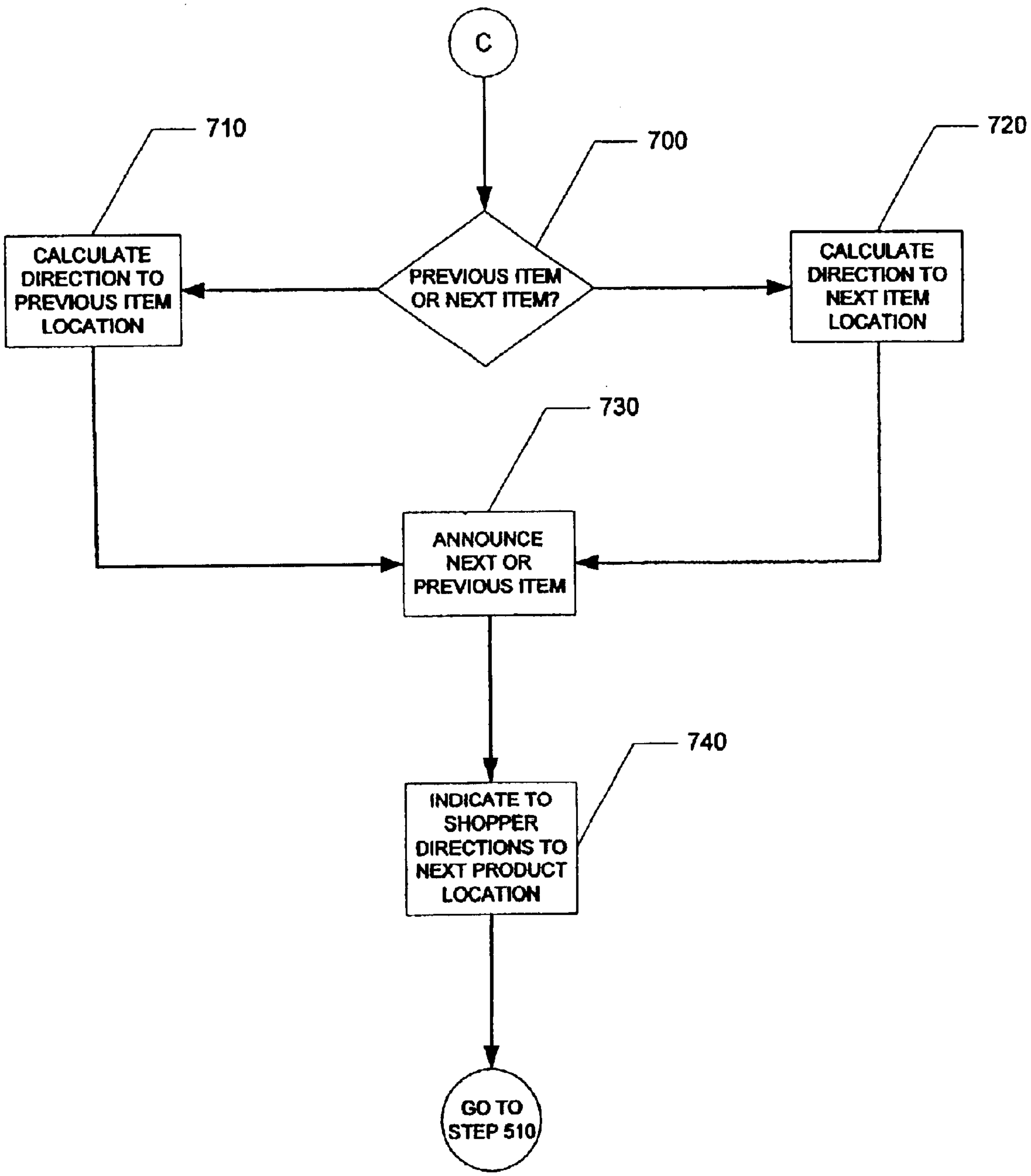

FIG. 5C is a flowchart of a method of navigation system 10 of the present invention described in relation to FIGS. 1 through 5B. FIG. 5C illustrates the next selection process which may be utilized at anytime, for example if the shopper decides to reduce the list because of time constraints or money concerns. In step 700, personal digital device 14 provides for selection of a previous item or next item. This step may always be available by vocal command or by physical command and also includes indications from personal digital device 14 to the shopper of the next item to pursue. Whichever direction the shopper chooses to go through the list, once an item is selected personal digital device 14 calculates a route to the selected item, steps 710 and 720. In step 710, the shopper selects an item earlier in the list and the interactive route recalculates a route from the current location. In step 720, the interactive route recalculates a route from the current location to the item selected that is not the next listed item in the original list. In step 730, the item is selected and the direction to move is indicated to the shopper, step 740. The process then continues to step 510. The process may be terminated upon the shoppers request or once all the listed items have been found. Upon completion of the item list, digital device 14 may indicate a route to a payment station and/or exit (not shown).

Although the present invention and its advantages have been described in detail, it should be understood that various changes, substitutions and alterations can be made herein without departing from the spirit and scope of the invention as defined by the appended claims. It should be recognized that the present method and system may be utilized by any individual to speed shopping or locating items in a facility. The label may be a wireless communication device that does not have the ability to visually display information.

What is claimed is:

1. A system for aiding a user to navigate a route through a facility having a plurality of selected locations comprising:

a facility processor having a database and software stored thereon for mapping an interactive route from a first selected location to a second selected location within said facility;

a plurality of labels placed in proximity to individual items located within said facility, each of said labels electronically communicating information specific to one of said items; and a digital device having said interactive route electronically stored thereon, said digital device communicating to said user and electronically communicating with said facility processor and said labels for tracking movement of said digital device along said interactive route via communication with said labels and communicating a direction to move to follow said route, wherein said digital device polls at least one label of said plurality of labels for information associated with said labels, wherein said communication to user results in a vibration to a shopping cart.

2. The navigation system of claim 1, wherein said digital device communication to said user is at least via one of visual signals or audible signals.

3. The navigation system of claim 1, wherein said digital device communication to said user is at least via audible signals.

4. The navigation system of claim 1, wherein said digital device tabulates a price of items selected and communicates said tabulated price to said user.

5. The navigation system of claim 2, wherein said digital device tabulates a price of items selected and communicates said tabulated price to said user.

6. The navigation system of claim 1, wherein said digital device tabulates a price of items selected and communicates said tabulated price to said user.

7. The navigation system of claim 3, wherein said digital device tabulates a price of items selected and communicates said tabulated price to said user.

8. A customer assistance system for a store that provides information to a shopper within said store by communicating signals to said shopper via a digital device, comprising:

a facility processor having a database and software stored thereon for tracking an interactive route of shopper from a first selected location to a second selected location within said facility;

a plurality of labels placed in proximity to individual items located within said facility, each of said labels electronically communicating information specific to one of said items; and a digital device in proximity to the shopper and in wireless communication with said processor and said shopper to provide tracking information of interactive route of shopper to said processor, store tracking information of interactive route of shopper thereon, communicate assistive information to said shopper in response to interactive route of shopper, and electronically communicate polling data to said processor by polling at least one label for item information associated with said label, wherein said assistive information is generated by processor in response to provided tracking information of interactive route of shopper and communicated polling data of at least one label, and said assistive information is transmitted by said processor to said digital device at a predetermined time for communication to said shopper;

and wherein said communication to shopper results in a vibration to a shopping cart.

9. The navigation system of claim 8, wherein said communication to shopper is also by visual display on said device.

10. The navigation system of claim 8, wherein said communication to shopper is also by audible signal.

11. The navigation system of claim 8, wherein said digital device tabulates a price of items selected and communicates said tabulated price to said shopper.

12. The navigation system of claim 8, wherein said assistive information is a signal suggesting a purchase option for said shopper in relation to the interactive route of said shopper and polling data at a predetermined time.

13. The navigation system of claim 12, wherein said signal is also an audible signal.

14. The navigation system of claim 8, wherein said digital device is operable with a shopping cart and said assistive information is initiated by physical stimulation to shopper via said shopping cart and a visual or audible purchase option for said shopper in relation to the interactive route of said shopper and polling data at a predetermined time.

15. The navigation system of claim 8, wherein said assistive information is a visual display suggesting a route for the shopper to follow in relation to the interactive route of said shopper and polling data at a predetermined time.

* * * * *